United States Patent [19]

Allard

[11] Patent Number: 5,145,340
[45] Date of Patent: Sep. 8, 1992

[54] PACKING FOR PISTON AND VALVE MACHINE

[75] Inventor: Pierre-Yves Allard, Fonsorbes, France

[73] Assignee: Dowell Schlumberger Incorporated, Tulsa, Okla.

[21] Appl. No.: 718,486

[22] Filed: Jun. 21, 1991

[30] Foreign Application Priority Data

Jun. 25, 1990 [FR] France ............... 90 08197

[51] Int. Cl.$^5$ ............ F04B 21/00; B65D 53/00; B67D 5/378
[52] U.S. Cl. ..................... 417/568; 92/165 R; 92/168; 277/125; 277/136; 277/195
[58] Field of Search ......... 417/568; 92/165 R, 168; 277/125, 136, 193, 198, 195

[56] References Cited

U.S. PATENT DOCUMENTS

| | | | |
|---|---|---|---|
| 410,918 | 9/1889 | Philper | 277/195 |
| 3,940,151 | 2/1976 | Phillips | 92/165 R |
| 4,540,186 | 9/1985 | Beidler | 277/198 |

*Primary Examiner*—Leonard E. Smith
*Assistant Examiner*—R. McAndrews
*Attorney, Agent, or Firm*—Stephen A. Littlefield

[57] ABSTRACT

A packing is disclosed for piston and valve machine, an annular metal body (20) intended to be immobilized in the first recess by a clamping nut and, in its internal pheripheral face (24), an annular second recess (25), a gasket holding and stress ring (27) disposed in the second recess while being immobilized against the bottom thereof, a gasket (28) formed by at least two packing rings (29) split over the whole of their axial length and over their thickness, side by side, deformable radially and not axially and whose radial thickness is greater than the measurement complementary to the thickness of the ring to equalize the depth of the second recess, and a stop ring (35) in abutment against the bottom of the second recess, on which the gasket bears.

15 Claims, 3 Drawing Sheets

PACKING FOR PISTON AND VALVE MACHINE

The present invention relates to the technical field of piston and valve machines, such as pumps and compressors and it relates more specifically to the high pressure pumps used for causing a charged fluid to flow for supplying, at high pressures, even very high pressures, regularly and continuously, to a user, transfer or distribution installation etc.

By charged fluid is meant any liquid, viscous, even substantially pasty product, formed of a liquid or viscous phase including, possibly, any charge which may be mineral.

In numerous applications, there is need to convey a charged fluid, at high pressure, while ensuring a continuous flow for the correct operation of the user, distribution or transfer installation. Such is the case, by way of a preferred but non limitative industrial application, of the mud and cement slurries used in well, particularly oil well, drilling processes and for working such wells, as also for all the well know steps of the life of such a well.

To assume the above function, the prior art proposed using a high pressure machine defining a cylinder containing a piston and opening into a pressurization chamber. The pump body defines two chambers with two seats with which two respective inlet and delivery valves cooperate.

In this kind of pump, in the cylinder is housed a packing cooperating with the external peripheral surface of the piston. Such packing is mounted in a recess, bearing against a shoulder, and is formed by a plurality of gaskets, of herringbone type, which are pre-stressed by a ring on which a clamping nut acts. It may be considered that such pads are of the lipped type and that the pre-stress is intented to adjust, by deformation of the gaskets, clamping thereof about the piston.

Although such pumps may be considered as answering the first function of causing a fluid to flow under high, even very high, pressure, in practice they are less satisfactory for the flow of charged fluids which are responsible for rapid deterioration of the packing.

For drilling muds or cementing fluids in oil drilling techniques, it is not rare to discover the deterioration of the packing after an operating time of only ten or several tens of hours.

To take into account this requirement pressurized fluid production installations generally comprise a battery of identical pumps some of wh.:ch are operating and others are on stand-by to be actuated in the of malfunctioning of the first ones.

Apart from this obligation which makes the installation heavier and makes it expensive and difficult to control in operation, it should be noted that deterioration of the packing always involves a repair operation which is long, difficult and expensive, with an additional difficulty concerning the delicate adjustment of the clamping of the gaskets.

The present invention aims at overcoming the known drawbacks of packings for high pressure pumps of the prior art and, for this, proposes a new packing formed so that the sealing character, by cooperation with the peripheral surface of the piston, occurs by self-stressing of the gasket as a function of the operating conditions, from an initial rest position in which said packing is either free of stress or subjected to an initial low pre-stress.

Thus, the sealing members, responsible for cooperation with the peripheral surface of the piston, only undergo wear in direct relation with the operating conditions and have therefore an increased lifespan.

In a particular arrangement of the invention, the packing is designed to comprise shaped sealing elements made preferably from a ceramic material.

Another object of the invention is to provide a new packing which can be mounted easily and rapidly in the cylinder without requiring a delicate clamping adjustment operation, as in traditional fitting.

To attain the above objects, the packing according to the invention is characterized in that it comprises:

first an annular metal body intented to be immobilized in the recess by a clamping nut and comprising, in its internal peripheral face, an annular second recess opening in the direction of the transverse face opposite that on which the nut bears, a packing holding and stress ring disposed in the second recess, while being immobilized against the bottom thereof and having a radial thickness less than the depth of the second recess, a packing formed by at least two packing rings split over their axial length and their thickness, side by side, deformable radially and not axially, in which said slits are offset angularly, immobilized angularly n the ring and whose radial thickness is greater than the measurement complementary to the thickness of the ring to equal the depth of the second recess, and a stop ring bear ng against the bottom of the second recess, on which the packing bears and whose internal diameter is greater than that of the packing.

The invention also relates to a piston and valve machine using the above packing.

Different other characteristics will be clear from the following description with reference to the accompanying drawings which show, by way of non limitative examples, embodiments of the invention.

Figure 1:
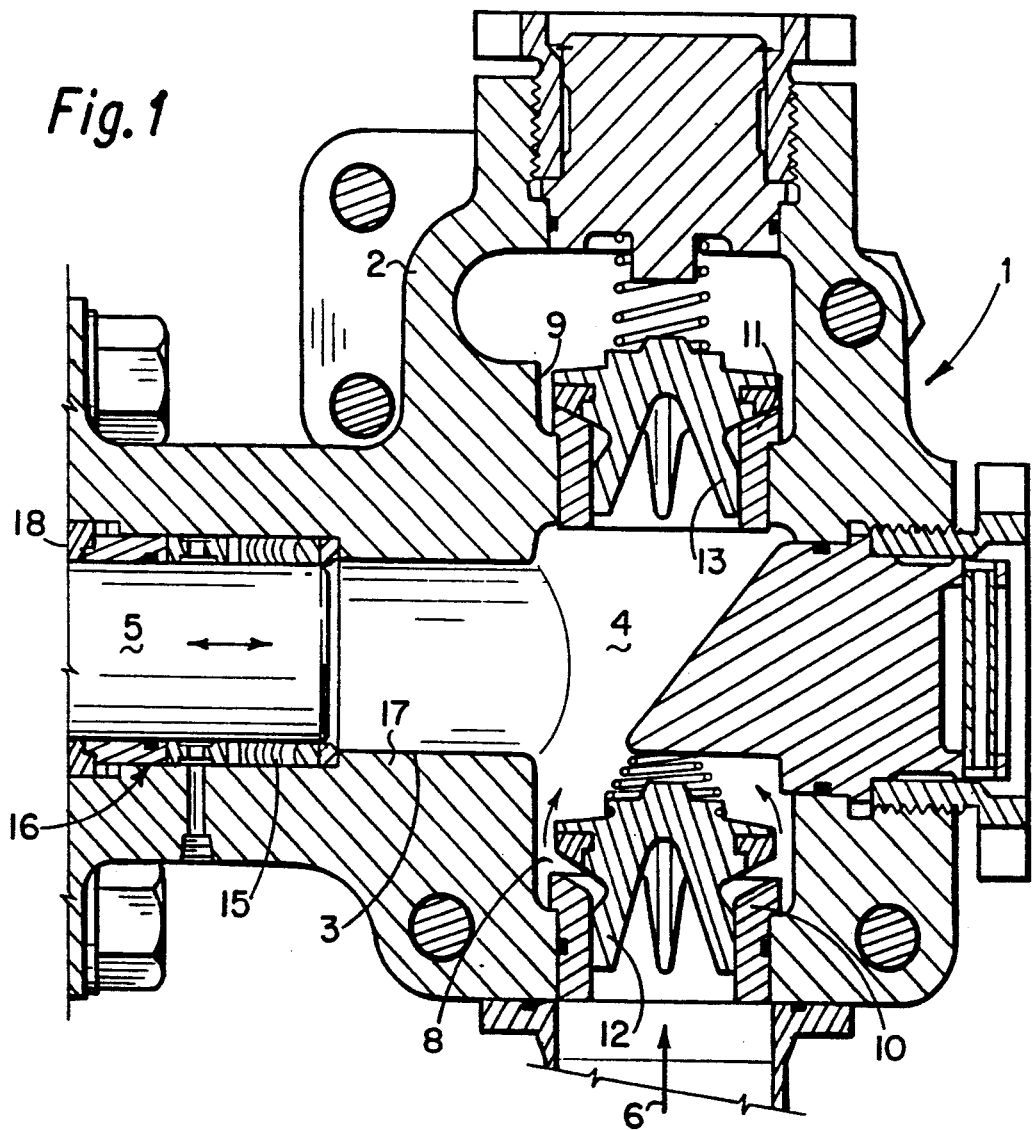
FIG. 1 is a section in elevation of a piston and valve machine according to the prior art.

The packing according to the invention is intented to equip a machine 1, for example a compressor or, preferably, a high pressure, even very high pressure pump comprising, traditionally, a pump body 2 defining a cylinder 3 communicating with a pressurization chamber 4. Cylinder 3 is intented to guide sealingly a sliding piston 5 whose reciprocal movement in rectilinear travel along arrow $f_1$ produces the suction and delivery, from chamber 4, of a fluid which may be charged taken from an inlet circuit 6 and delivered to a delivery circuit 7. For this, the pressurization chamber 4 defines two valves chests 8 and 9 having two seats 10 and 11 for cooperating with two valves 12 and 13 resiliently slaved to the closed position and called respectively, intake and delivery.

The sealing function between piston 5 and cylinder 3 is provided by a packing 15 which is housed in a first recess 16 formed in cylinder 3. Packing 15 is immobilized against a shoulder 17 of first recess 16, via a clamping nut 18 accessible from the open section of cylinder 3 opposite that in relation with chamber 4.

In the example shown in FIG. 1, packing 15 is of the herringbone seal type, as is know in the prior art, with the drawbacks which have just been recalled above and which the invention aims at overcoming.

Figure 3:
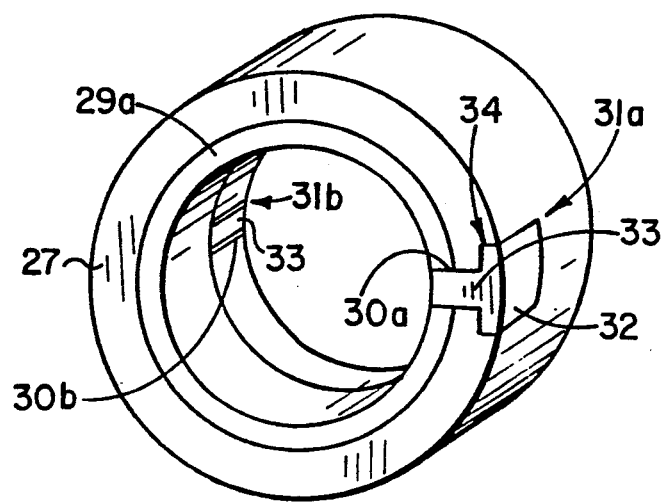
FIG. 3 is a perspective view substantially through III—III of FIG. 2.
Figure 2:
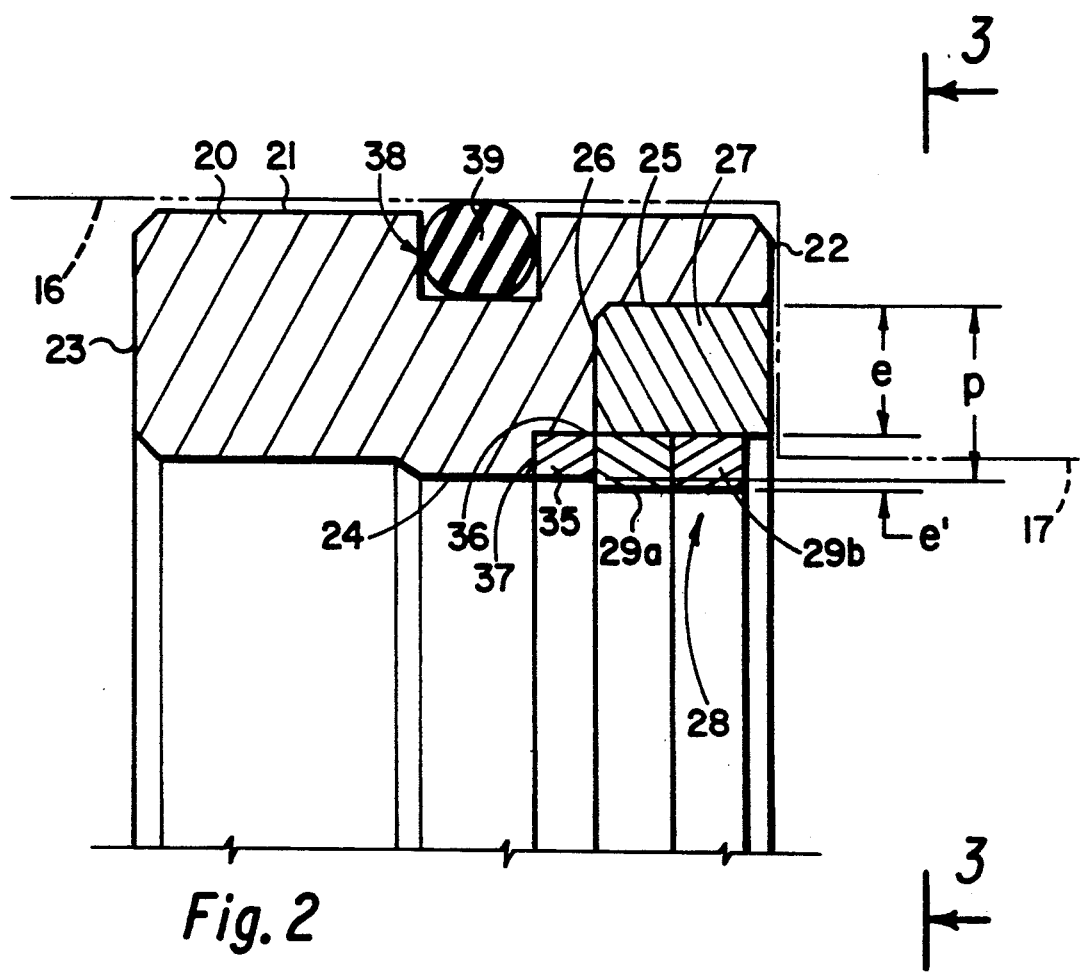
FIG. 2 is a half section in elevation of a first embodiment of the packing according to the invention.
Figure 4:
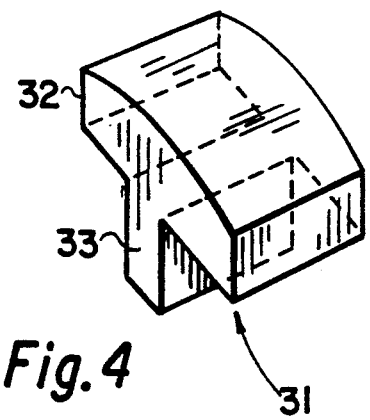
FIG. 4 is a perspective view showing the particular embodiment of one of the elements forming the packing.

In the embodiment illustrated in FIGS. 2 to 4, the packing according to the invention comprises an annular metal body 20 intented to be mounted in first recess 16. The annular metal body 20 a peripheral-external cylindrical surface 21, two transverse faces 22 and 23, called respectively stop face for cooperating with shoulder 17 and clamping face for cooperating with nut 18, and an internal peripheral face 24.

Body 20 comprises, from its transverse face 22 and in its internal peripheral face 24, an annular second recess 25 having a constant radial depth p and with a transverse bottom 26. Second recess 25 is occupied by a packing-holding ring 27, called stress ring, whose radial thickness e is less then depth p of second recess 25. In one embodiment, illustrated in FIG. 2, ring 27 occupies the whole axial length of second recess 25, so as to be flush with the transverse face 22.

Ring 27 is made from any material accepting resilient deformation under load. Preferably, ring 27 is made from polymer, such as polyurethane or a material having equivalent mechanical characteristics, numerous examples of which are well known in the art. Ring 27 is, in all cases, intended to be immobilized in second recess 25 in abutment against bottom 26. In the example shown in FIG. 2, such immobilization results from direct imprisonment in second recess 25, between bottom 26 and shoulder 17.

Ring 27 carries a gasket 28 which is formed of at least two packing rings 29a and 29b disposed side by side, split transversely, so as to be deformable radially and not axially. Packing rings 29a and 29b are made from any appropriate material, so as to be able to cooperate directly with the external peripheral surface of piston 5. In a preferred embodiment, packing rings 29a and 29b are made from a ceramic material, for example with an alumina or alumina-zircone or zircone basis, or equivalent well known materials.

To cooperate with the external peripheral surface of piston and to be the only ones to do so, packing rings 29a and 29b have a radial thickness e' which is greater than the measurement which would be complementary to thickness e of ring 27 to equal the depth p of second recess 25. Thus, packing rings 29a and 29b project from the internal peripheral face 24 of body 20.

Packing rings 29a and 29b are mounted inside ring 27 in which they are immobilized angularly, so that the axial slits 30a and 30b which they comprise are offset angularly. In FIG. 3, this angular offset corresponds preferably to 180°.

Packing rings 29a and 29b are immobilized angularly in ring 27 while being disposed side by side, via two keys 31 each comprising (FIG. 4) a head 32 and a tongue 33. Each key 31 is engaged in a complementary through housing 34 formed in the thickness of ring 27. The radial length of tongue 33 is such that, after insertion of key 31 in housing 34, it is engaged in the slit 30a 30b of the corresponding packing ring.

The packing further comprises a stop ring 35 which is disposed in a countersunk portion 36 formed from bottom 26 and from the internal peripheral face 24 for defining a bearing seat 37. The stop ring 35 has a cross section exactly complementary to the countersunk portion 36, so as to form a bearing surface for gasket 28 and, more particularly, for packing ring 29a without projecting from the internal peripheral face 24.

The packing further comprises, in its external peripheral face 21, a groove 38 for fitting a seal 39, for example an O-seal.

In FIG. 2 it can be seen that the packing of the invention has a gasket 28 formed of two packing rings 29a and 29b which are the only ones to project from the internal peripheral face 24, so as to cooperate with the external peripheral face of piston 5 Furthermore, since second recess 25 opens from the transverse face 22, ring 27 and packing rings 29a and 29b are exposed to the pressure of the fluid occupying chamber 4.

Figure 5:
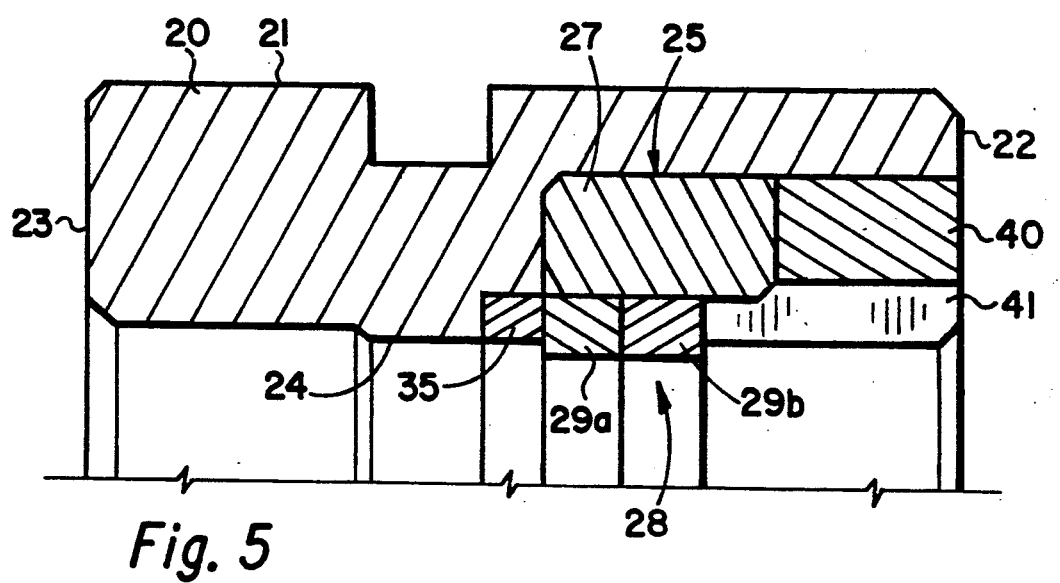
FIG. 5 is a half section in elevation, similar to FIG. 2, but illustrating a preferred variant.
Figure 6:
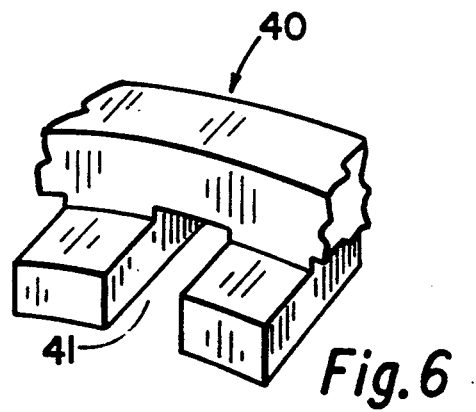
FIG. 6 is a partial perspective view, with parts cut away, illustrating the particular embodiment of one of the component elements according to the variant of FIG. 5.

FIG. 5 shows a variant in which the packing comprises a ring 27 whose axial length is less than that of second recess 25 The packing is then completed by the presence of a ring 40, called stop ring antagonistic to ring 35 and whose length is chosen so that it is flush with the transverse face 22. As is illustrated in FIG. 6, ring 40 is of the type indented from its internal peripheral face, so as to leave here and there passages 41 which maintain the relation between the ring 27 and gasket 28 and the pressurization chamber 4. Preferably, ring 40 is of the type undercut from its outer peripheral face, so as to have a cross sectional conformation complementary to the axial offset between ring 27 and gasket 28, so as to immobilize packing rings 29a and 29b axially between itself and the stop ring 35. The radial thickness of ring 40 is less than the sum of the thickness e, e' so as to comply with the condition of cooperation only of packing rings 29a and 29b with the external peripheral face of piston 5.

The above described packing is mounted in recess 16 as described below with reference to FIG. 7.

The packing, in the form of a unit, is slid with an easy fit into first recess 16 after a seal 39 has been fitted in groove 38. The purpose of this seal is to provide sealing between body 20 and first recess 16.

The packing is inserted so as to bring face 22 in abutment against shoulder 17, either directly, or via a spacer washer 42, of metal type, havin9 a radial thickness equal to the depth of first recess 16 and permitting adjustment of the exact transverse position of gasket 28. After insertion, body 20 is immobilized axially, by clamping nut 18 which acts, directly or via a load distribution washer 43 on the transverse face 23.

The clamping carried out causes only an axial stress which can be withstood by the different stacked metal parts, without resulting in pre-stressing of a gasket with deformable character.

Figure 7:
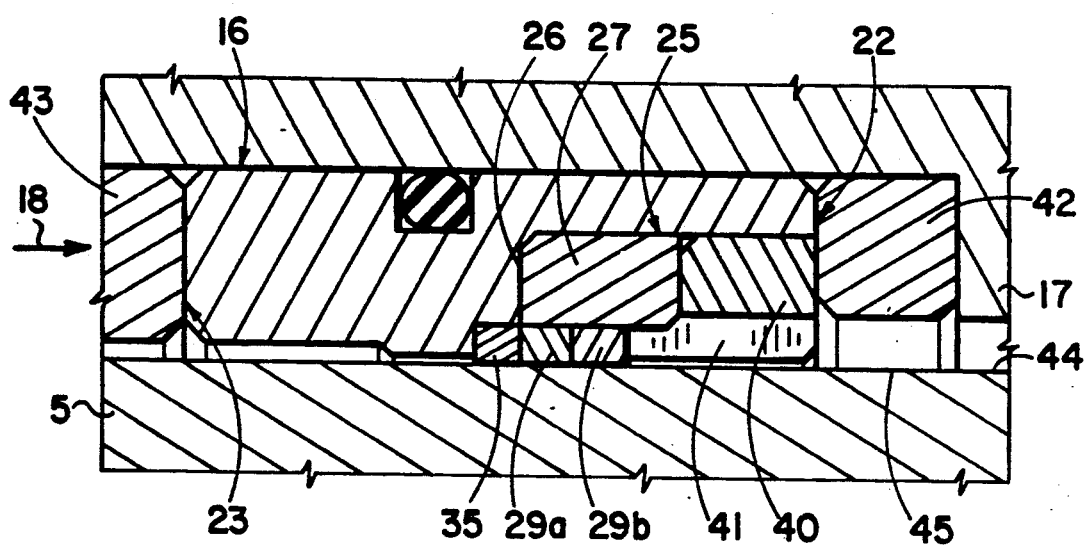
FIG. 7 is a half section in elevation showing, on a larger scale, fitting of the packing into a machine of the type illustrated in FIG. 1.

In this position, such as illustrated in FIG. 7, ring 27 is immobilized axially against bottom 26, either directly or via an indented ring 40, as shown in FIGS. 2 or 5. When ring 40 is provided, which forms a preferred embodiment of the invention, fitting of the packing also results in axially immobilizing gasket 28, since packing rings 29a and 29b are held in position between the antagonistic stop rings 35 and 40.

In the assembled condition, such as follows from the above insertion, piston 5 may then be engaged in cylinder 3, so as to cooperate, by its external peripheral face 44, with gasket 28, the packing rings 29a and 29b of which have been subjected, during engagement of piston 5, to a radial resilient deformation by partial opening of their slits 30a and 30b.

In the rest condition, such as shown in FIG. 7, the stressing of packing rings 29a and 29b results simply from fitting adjustment and may be considered as negligible, considering the material forming the packing rings, their shape and their mode of fitting inside ring 27 made from a material accepting resilient deformation.

During operation by rectilinear reciprocal movement of piston 5, a pressure rise occurs in chamber 4 for each delivery stroke of piston 5. This pressure rise is applied, because of the opening in transverse face 22, on ring 27 and on packing rings 29a and 29b. This pressure, transmitted by the fluid to be delivered, subjects ring 27 to resilient deformation which self-adapts to the pressure variation in chamber 4. Ring 27 is pre-stressed in an axial but also radial direction whose first function is to provide sealing with second recess 25. The second function of this pre-stress is to clamp packing rings 29a and 29b against the external peripheral face of piston 5 with a pressure which increases in direct relation with the pressure inside chamber 4. Simultaneously, the pressurized fluid acts axially on packing ring 29b which pre-stresses packing ring 29a against stop 35. The radial and axial pre-stresses, varying with the variations of pressure in chamber 4, provide then self-adjustment of gasket 28 clamped about the external peripheral face 44 of piston 5, depending on the pressure prevailing in chamber 4.

Thus, the stress imposed on gasket 28 is an exact function of the sealing factor to be established, so that the fatigue imposed on the packing is adapted to the different operating conditions and allows reliable service to be provided with a wear factor which is appreciably less than that of traditional packing designs using herringbone seals.

The construction of gasket 28 from two packing rings side by side, made preferably from a ceramic material, confers resistance in time which is particularly high, even under high pressure and high temperature conditions.

With the external ring 27 holding packing rings 29a and 29b in position, these packing rings can be caused to operate with variations of diameter self-adaptive to the pressure conditions and even to provide efficient clamping on the peripheral wall 44 after an initial running in period.

Axial immobilization of ring 27 and that of gasket 28, between the antagonistic stop rings 35 and 40, makes it possible for packing rings 29a and 29b to work under optimum conditions, despite the outward and inward linear movements of piston 5.

Because the contact with piston 5 is limited solely to packing rings 29a and 29b, the reciprocal movement of piston 5 causes minimum friction making it possible to maintain operating conditions at an acceptable temperature.

Naturally, ring 35 will have to be made from a material with a hardness compatible with that of packing ring 29a, which is made from ceramic. In a quite preferred way, ring 35 will itself be made from ceramic.

It should moreover be noted that opening of the packing on its face 22 allows the incoming and outgoing fluid to take heat from gasket 28 and to regulate the operating temperature resulting from friction between packing rings 29a and 29b and the peripheral surface 44.

Such removal of heat also takes place through the rear face, from the stop ring 35, via the lubricating fluid which occupies the portion of the cylinder isolated from the pressurization chamber 4, via gasket 28.

Preferably, the peripheral face 44 of the piston comprises, in its portion cooperating with gasket 28, a coating 45, particularly based on tungsten carbide or silicon carbide or an equivalent material.

The invention is not limited to the examples described and shown but different modifications may be made thereto without departing from the scope of the invention.

I claim:

1. Packing for piston and valve machine, of the kind housed in a first recess (16) of the cylinder (3) of such a machine and comprising at least one gasket adapted to cooperate with the piston (5) of the machine, characterized in that it comprises:

an annular metal body (20) immobilized in the first recess by a clamping nut (18) and comprising, in its internal peripheral face (24), an annular second recess (25) opening in the direction of the transverse face (22) opposite that on which the nut bears, a gasket holding and stress ring (27) disposed in the second recess while being immobilized against the bottom (26) thereof and having a radial thickness (e) less than the depth (p) of the second recess, a gasket (28) formed by at least two packing rings (29) split over their axial length and over their thickness, side by side, deformable radially and not axially, in which said slits (30) are offset angularly, immobilized angularly in the gasket holding ring (27) and whose radial thickness (e) is greater than the measurement complementary to the thickness of the gasket holding ring to equalize the depth of the second recess, and a stop ring (35) bearing against the bottom of the second recess on which the gasket bears and whose internal diameter is greater than that of the gasket.

2. Packing according to claim 1, characterized in that the gasket holding (27) is made from a material accepting resilient deformation whereas the packing rings (29) are made from a ceramic material.

3. Packing according to claim 1 or 2, characterized in that the packing rings (29) are each immobilized angularly by means of a key (31) which is inserted in a through housing (34) defined complementarily in the thickness of the gasket holding ring (27) and which has a tongue (33) engaged in the slit of the packing ring.

4. Packing according to claim 1 or 2, characterized in that the gasket holding ring (27) and the packing rings (29) have an axial measurement less than that of the second recess (25) which is also occupied by a metal ring (40) indented in its internal peripheral face and which assumes a stop function antagonistic to the stop ring (35).

5. Packing according to claim 1, characterized in that the stop ring (35) is housed in a complementary countersunk portion (36), formed from the internal peripheral face of the body and from the bottom of the rebate.

6. Packing according to claim 1, characterized in that the annular body (20) has, in its internal peripheral face, an annular groove (38) intended to be occupied by a seal (39).

7. Piston and valve machine, of the pump or compressor type, comprising a body defining, on the one hand, a pressurization chamber (4) equipped with an inlet valve (12) and a delivery valve (13) and, on the other hand, a cylinder (3) communicating with the chamber and containing a sliding piston (5), said cylinder comprising, on a part of its length, a first recess (16) of larger diameter adapted to contain, bearing against a shoulder (17) which it defines in its connection zone with the cylinder, a packing (15) clamped by a nut (18) and adapted to cooperate locally with the peripheral surface of the piston, characterized in that said packing comprises:

- an annular metal body (20) immobilized in the recess (16) against the shoulder (17) by a clamping nut (18) and comprising, in its internal peripheral face, an annular second recess formed from the transverse face (22) of the ring directed towards the pressurization chamber (4),
- a gasket holding an stress ring (27) disposed in the second recess while being immobilized against the bottom (26) thereof and having a radial thickness (e) less than the depth (p) of the second recess,
- a gasket (28) formed by at least two packing rings (29) side by side, deformable radially, immobilized angularly in the gasket holding ring and whose slits (30) are offset angularly and whose thickness (e') is greater than that complementary to the thickness of the gasket holding ring to equal the depth of the second recess, so as to cooperate alone with the external peripheral face of the piston,
- and a stop ring (35) bearing against the bottom of the second recess on which the basket (28) bears and whose internal diameter is greater than that of said gasket.

8. Machine according to claim 7, characterized in that the gasket holding ring (27) is made from a material accepting resilient deformation whereas the packing rings (29) are made from a ceramic material.

9. Machine according to claim 7 or 8, characterized in that the packing rings (29) are each immobilized angularly by means of a key (31) which is inserted in a through housing (34) defined complementarily in the thickness of the gasket holding ring (27) and which has a tongue (33) engaged in the slit of the packing ring.

10. Machine according to claim 7 or 8, characterized in that the gasket holding ring (27) and the packing rings (29) have an axial measurement less than the length of the second recess (25) which is also occupied by a metal ring (40) indented in its internal peripheral face, flush with the transverse face (22) of the annular body (20) directed towards the chamber and which assumes a stop function antagonistic to the stop ring (35) for the gasket holding ring and the packing rings.

11. Machine according to claim 7, characterized in that the stop ring (35) is housed in an annular countersunk portion (36), formed from the internal peripheral face of the body and from the bottom of the second recess.

12. Machine according to claim 7, characterized in that the annular body (20) has, in its external peripheral face, an annular groove (38) occupied by a seal (39)—cooperating with the annular wall of the first recess (16).

13. Machine according to claim 7, characterized in that the packing is clamped against the shoulder (17) with interpositioning of a spacer washer (42) whose radial thickness equals the depth of the first recess.

14. Machine according to claim 7 or 8, characterized in that the packing rings (29) cooperate with an easy fit with the peripheral surface of the piston (5), which is provided with a compatible surface treatment (45), particularly tungsten carbide or silicon carbide.

15. Machine according to claims 7 or 8, characterized in that the packing rings (29) cooperate with an easy fit with the peripheral surface of the piston (5), which is provided with a compatible surface treatment (45), particularly tungsten carbide or silicon carbide. The packing rings (29) are each immobilized angularly by means of a key (31) which is inserted in a through housing (34) defined complementarily in the thickness of the gasket holding ring (27) and which has a tongue (33) engaged in the slit of the packing ring.

* * * * *